Feb. 7, 1961  J. H. WILLIAMS  2,970,606
VALVE AND CORROSION INHIBITOR ASSEMBLY
Filed Oct. 29, 1958
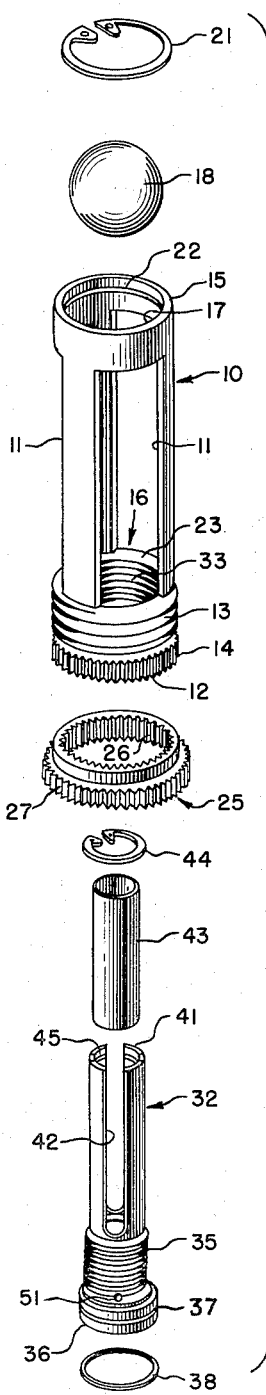
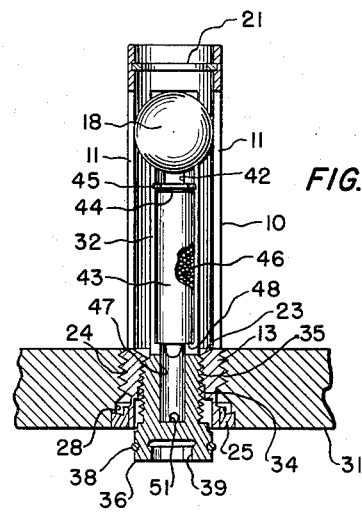
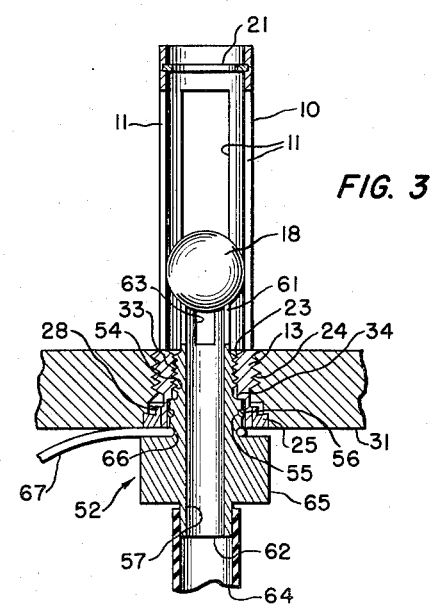
INVENTOR.
JOEL H. WILLIAMS
BY
ATTORNEY United States Patent Office 2,970,606
Patented Feb. 7, 1961

2,970,606

VALVE AND CORROSION INHIBITOR ASSEMBLY

Joel H. Williams, Fort Worth, Tex., assignor to General Dynamics Corporation, San Diego, Calif., a corporation of Delaware Filed Oct. 29, 1958, Ser. No. 770,518

9 Claims. (Cl. 137—268)

The present invention generally relates to a composite fitting for fuel tanks, and more particularly relates to a fitting which functions as a fuel drain, moisture vent, and corrosion inhibitor.

Previously, these functions have been performed by separate vent valves, separate corrosion inhibitor containers, and separate drain valves.

The disadvantages accompanying the use of separate devices include the relatively large amount of space required for installation, increased weight, long installation time, reduced reliability, and increased cost that naturally accompanies such factors.

It is therefore an object of the present invention to provide one composite fitting that will perform the functions previously performed by three separate fittings.

Another object is to provide a simple means of venting moisture due to condensation inside tanks.

Another object is to provide a corrosion inhibitor container that can be removed for inspection and changing of inhibitors at any time without draining of the tank.

Other objects and features of the present invention will be readily apparent to those skilled in the art from the following specification and appended drawing wherein is illustrated a preferred form of the invention, and in which:

Figure 1 is an exploded perspective view of the composite fitting,

Figure 2 is a cross sectional view of the assembled composite fitting, and

Figure 3 is a cross sectional view of an alternate part that can be used as an integral element of the composite fitting.

Referring now to these figures, the present invention is shown therein as including a substantially cylindrical cage member or housing 10 having a plurality of longitudinal slots 11. Near the lower end 12 of cage member 10 there is an exterior threaded portion 13 and, immediately adjacent the lower end 12, a plurality of circumferential serrations 14. The cage member is open at both upper end 15 and lower end 12, having a neck 16 in lower end 12 and an opening 17 in upper end 15.

A ball 18 is disposed in cage member 10 and is longitudinally movable therein. A retainer ring 21 in a groove 22 of cage member 10 prevents the ball from leaving the cage at its upper end. Near the lower end of the cage the ball 18 seats against an inner rim 23 of neck 16 to form a fluid tight seal.

Cage member 10 is thus adapted for use in a fuel tank with ball 18 and neck rim 23 forming a seal to prevent loss of fuel. The exterior threads 13 of the cage member engage mating threads in a tapped hole 24 in the fuel tank wall to secure the cage member thereto, as shown in Figures 2 and 3. If desired, a sealant may be used with threads 13 to insure a fluid tight connection.

An additional safety precaution can be taken, however, which will insure that vibration, shock, and other environmental factors do not cause the cage member 10 to loosen or back out of tapped hole 24. This safety precaution is the use of a lock ring 25 shown in the drawing. Both the inner and outer circumference of lock ring 25 contain a plurality of serrations, designated 26 and 27 respectively. After cage member 10 is threadedly engaged in tapped hole 24 then lock ring 25 is forced into an enlarged or stepped portion 28 of hole 24. In this position the outer lock ring serrations 27 bite into fuel tank wall 31 and the inner lock ring serrations forcibly mesh with cage member serrations 14 to rigidly lock the cage member in the wall of the fuel tank.

It should be noted that when the cage is in place, its lower end 12 is flush with wall 31. This assures the aerodynamic smoothness which is a prime requisite on modern high speed aircraft.

In addition to cage member 10, another integral part of the present invention is the sleeve 32 shown in the drawing. Sleeve 32 is substantially cylindrical and is adapted to be inserted in cage member 10 and fastened therein. The neck 16 of cage member 10 is a stepped neck consisting of a threaded upper portion 33 and a stepped lower portion 34. Sleeve 32 has exterior threads 35 which engage with threaded portion 33 of neck 16 to fasten the sleeve to the cage member. The lower end portion 36 of sleeve 32 contains a socket recess 39 which is an aid in screwing sleeve 32 into place. The lower portion of sleeve 32 is a slightly enlarged portion containing an O-ring groove 37 and O-ring 38. When sleeve 32 is fully inserted in cage member 10 then O-ring 38 provides a fluid tight seal between sleeve 32 and the stepped lower portion 34 of the cage neck 16.

The lower end 36 of sleeve 32 is closed while the upper end 41 is open. A plurality of longitudinal slots 42 are positioned in the sleeve to admit fluid thereto. A container 43 is disposed within sleeve 32 and prevented from escaping therefrom by a retainer ring 44 in a groove 45 adjacent upper sleeve end 41. Container 43 is a porous container which allows fluid to circulate therethrough. As such, it may be made of wire mesh or other foraminous material. Inside container 43 is disposed corrosion inhibiting material 46 which dissolves in moisture which has condensed from the atmosphere inside the tank. Such materials are quite common and conventional—often being referred to as "corrosion inhibitors."

The container 43 lies within sleeve 32 in a stepped passageway 47 that leads down into the interior of the lower portion of the sleeve. The container is prevented from falling into the lower portion by the step 48 in the passageway 47. A hole 51 in the side of sleeve 32 provides an exit from the bottom of passageway 47. It is important to note that hole 51 exists between the O-ring seal 38 on sleeve 32 and the exterior threads 35 of sleeve 32.

The effect of this hole 51 can best be understood from an explanation of the operation of the composite fitting. Referring particularly to Figure 2, it can be seen that when it is desired to drain the tank, sleeve 32 is inserted in cage member 10 and ball 18 is unseated and moved towards the upper end of the cage. If sleeve 32 were fully inserted it would hold ball 18 against the retainer ring 21 in the upper end of the cage member. Of more importance, however, is the fact that when in the fully inserted position, the O-ring 38 would form a fluid tight seal between the sleeve and the cage member.

Fluid in the tank enters cage 10 through slots 11, then enters sleeve 32 through slots 42, and then flows down passageway 47 and out exit hole 51. Since O-ring 38 is below exit hole 51, no fluid can escape from the composite fitting as long as sleeve 32 is screwed into cage member 10 far enough to cause the O-ring to act as a seal.

To drain or vent the fuel tank, the sleeve is only partially inserted in the cage member so that the O-ring seal does not contact stepped lower portion 34 of the cage neck. Fluid can then flow through hole 51 and out the neck of cage member 10.

After any residual fuel has drained from the tank, then the sleeve can be screwed completely into the cage member, if desired, and the corrosion inhibiting material 46 will take over the task of substantially eliminating the corrosive effect of water that is the result of condensation of moisture from atmosphere within the tank.

It is not necessary to fully insert the sleeve after draining the tank, however, for it may be desired to vent the tank. This is achieved by merely leaving the sleeve in its open position. In this open position the hole 51 will not admit such a quantity of air as to prevent the corrosion inhibiting material from being effective in the tank.

When it is desired to refill the fuel tank, the sleeve can be withdrawn from the cage member and ball 18 will seat against rim 23 of neck 16 to again form a fluid tight seal.

The composite fitting thus provides, in one integral unit, a simple and efficient device for draining a tank, preventing corrosion therein, and providing ventilation therefor.

One of these functions, however, that of draining the tank, can also be performed by an alternate part used in place of the sleeve 32. This alternate part consists of a substantially cylindrical probe 52 adapted to be inserted in cage member 10 as shown in Figure 3. Just as with sleeve 32, probe 52 has exterior threads 54 which mate with threads 33 in the upper portion of cage neck 16 to secure the probe to the cage member. Probe 52 also has an O-ring groove 55 and O-ring 56 which fit into stepped lower portion 34 of neck 16 to form a fluid tight seal therein. A passageway or duct 57 runs the entire length of the probe and is open on both the upper probe end 61 and lower probe end 62. The upper probe end 61 unseats ball 18 when it is inserted into cage member 10. A plurality of slots 63 are disposed in the upper probe end to admit fuel to duct 57 so that it can drain from the fuel tank and cage member. A hose 64 can be attached to the cylindrical lower end 62 of the probe to carry away fuel draining from duct 57. A circumferential nut 65 is positioned above the lower end of the probe and is an integral part of the probe. This nut is used to securely engage the threads of the probe with those of the cage member. It is also useful in disengaging the two members and serving as a stop for hose 64 as it is slipped over the cylindrical probe end 62.

A small circumferential groove 66 is disposed above this nut, lying between the nut and O-ring seal 56. The purpose of this groove is to provide a place for fastening an electrical ground wire, such as 67 shown in Figure 3. This is a safety measure for preventing gaseous explosions caused by electrical sparks. No such ground wire is shown attached to sleeve 32 but one could be easily attached thereto. This could be accomplished by means of a short screw placed in the bottom of socket recess 39 or by other similar means.

In some instances, the use of probe 52 for draining a tank may offer some advantages over the use of sleeve 32 for that purpose. In particular, as described, a hose can be used with the probe to carry the draining fuel to any desired receptacle. Because of this, it may be more convenient to first drain a tank by using the probe and then vent and dehumidify it by using sleeve 32. Of course, it would be possible to pull the hose from the end of the probe and use the probe as a vent also.

But these variations in the use of the present invention are but a few of those which may be apparent to those skilled in the art. Therefore, while certain preferred embodiments of the invention have been specifically disclosed, it is understood that the invention is not limited thereto as many variations will be readily apparent to those skilled in the art and the invention is to be given its broadest possible interpretation within the terms of the following claims.

What I claim is:

1. A composite fitting comprising a substantially longitudinal housing having an exterior and an interior, said housing having first and second end portions, said housing insertable in an aperture from one side thereof until said first end portion is flush with the one side of the aperture and said second end portion protrudes from the opposite side, a threaded section on said first end portion for securing said housing in a threaded aperture, locking means used in conjunction with said first end portion for positively locking said housing in place, an opening in said first end portion, a ball disposed in said housing interior and movable therein, said ball sealing said opening when seated thereagainst, means positioned at the second end portion of the housing for maintaining the ball therein, means for admitting fluid from the exterior to the interior of said housing, a substantially longitudinal sleeve insertable in said opening with a portion extending into said housing interior, said sleeve unseating said ball upon entry into said housing interior, means on said sleeve and said housing for securing said sleeve to said housing alternatively in a first substantially fully inserted position and in a second partially inserted position means in said sleeve for providing a fluid passageway between said housing interior and the area externally adjacent said first end portion of said housing and sealing means for blocking said passageway only when said sleeve is positioned in said first substantially fully inserted position.

2. A composite fitting for fuel tanks, said fitting comprising a substantially cylindrical housing having an exterior and an interior, said housing having first and second end portions, said first end portion having threads on the exterior thereof for engaging mating threads in an aperture, a serrated section on the exterior of said first end portion, a locking ring for positively locking said first end portion in place subsequent to threaded engagement of said exterior threads, said locking ring having interior circumferential serrations and exterior peripheral serrations with said interior circumferential serrations engaging the serrations on said housing and said exterior peripheral serrations engaging said surrounding aperture when said locking ring is inserted in its locking position, an opening in said first end portion, a ball disposed in said housing interior and longitudinally movable therein, said ball sealing said opening when seated thereagainst, means for retaining said ball within said housing, means for admitting fluid from said housing exterior to said housing interior, a substantially cylindrical sleeve insertable in said opening with a portion extending into said housing interior, said sleeve unseating said ball upon entry into said housing interior, threaded portions on said sleeve and in said opening which mutually engage to hold said sleeve in said housing, and means in said sleeve for providing a fluid passageway between said housing interior and the area externally adjacent said first end portion of said housing.

3. A composite fitting comprising a substantially cylindrical cage member, a sleeve in said cage member, said sleeve having first and second ends, a container in said sleeve, corrosion inhibiting material in said container, said cage member and sleeve and container all having openings to permit fluid to flow therethrough and contact said corrosion inhibiting material, said cage member having an end with an opening therein, said sleeve insertable second end first into said cage member through said opening, means associated with said sleeve enabling fluid to flow therefrom into said opening when said sleeve is not fully inserted into said cage member, said means being a fluid passageway within said sleeve which is provided with an exit extending through the side of said sleeve substantially adjacent its said first end, and a fluid seal peripherally disposed on said sleeve between said exit of said passageway and the first end of said sleeve.

4. A composite fitting comprising a substantially cylindrical cage member, a ball disposed in said cage member and longitudinally movable therein, a first end of said cage member having an open neck therein, said ball sealing said neck when seated thereagainst, a second end of said cage member including stop means for retaining said ball within said cage member, means in said cage member for admitting fluid thereto, an exterior threaded section on said cage member for securing said cage member in a threaded aperture, a substantially cylindrical sleeve insertable in said neck with a portion extending into said cage member, said sleeve unseating said ball and disposing it towards said second end of said cage member upon being inserted in said cage member, a threaded portion within said neck, a first end on said sleeve, a peripheral threaded portion substantially adjacent said first end of said sleeve, said peripheral threaded portion mating with said threaded portion within said neck to secure said sleeve to said cage member, said sleeve holding said ball against said stop means when said sleeve is fully inserted in said cage member, a peripheral fluid seal means positioned on said sleeve between said first end and said peripheral threaded portion to provide a fluid seal between said sleeve and said cage member, and means in said sleeve for providing a fluid passageway between the cage member interior and said first end of said cage member when desired.

5. A composite fitting comprising a substantially cylindrical cage member, a ball disposed in said cage member and longitudinally movable therein, a first end of said cage member having an open neck therein, said ball sealing said neck when seated thereagainst, a second end of said cage member including stop means for retaining said ball within said cage member, means in said cage member for admitting fluid thereto, exterior threads substantially adjacent said first end of said cage member for securing said cage member in a threaded aperture, a substantially cylindrical sleeve insertable in said neck with a portion extending into said cage member, a first and a second sleeve end, said second sleeve end unseating said ball and disposing it towards said second end of said cage member when said sleeve is inserted in said cage member, said cage member having an inner threaded portion in said neck, a peripheral threaded portion on said sleeve substantially adjacent said first end of said sleeve, said peripheral threaded portion mating with said threaded portion within said neck to secure said sleeve to said cage member, a peripheral fluid seal means positioned on said sleeve between said first sleeve end and said peripheral threaded portion to provide a fluid seal between said sleeve and said neck, a fluid passage in said sleeve, an opening in said sleeve for admitting fluid from said cage member to said fluid passage, and a fluid exit in the side of said sleeve located between said peripheral fluid seal means and said peripheral threaded portion, whereby fluid is allowed to escape from said cage member whenever said sleeve is positioned therein and said peripheral fluid seal means is not engaged with said neck.

6. A composite fitting comprising a substantially cylindrical cage member, a ball disposed in said cage member and longitudinally movable therein, a first end of said cage member having an open neck therein, said ball sealing said neck when seated thereagainst, a second end of said cage member including stop means for retaining said ball within said cage member, means adjacent said first end of said cage member for securing said first end of said cage member in an aperture, means in said cage member enabling a transverse flow of fluid therethrough, a substantially cylindrical sleeve insertable in said neck with a portion extending into said cage member, means in said sleeve enabling fluid from said cage member to circulate therethrough, a container within said sleeve, means in said container enabling fluid to circulate therethrough, and corrosion inhibiting material disposed in said container.

7. A composite fitting comprising a substantially cylindrical cage member, a ball disposed in said cage member and longitudinally movable therein, a first end of said cage member having an open neck therein, said ball sealing said neck when seated thereagainst, a second end of said cage member including stop means for retaining said ball within said cage member, exterior means substantially adjacent said first end of said cage member for securing said first end of said cage member in an aperture, means in said cage member enabling a transverse flow of fluid therethrough, a substantially cylindrical sleeve having a first portion insertable in said neck with a second portion extending into said cage member, means for securing said sleeve first portion to said cage member, said means for securing being located substantially adjacent said first end of said cage member in said neck and providing a substantially fluid tight seal between it and said sleeve, a seal on said sleeve first portion for providing a fluid tight seal between the sleeve and said cage member, means in said sleeve enabling fluid from said cage member to flow therethrough, a fluid outlet from said sleeve first portion positioned in the side of said sleeve between said means for securing and said seal, a container within said sleeve, means in said container enabling fluid to circulate therethrough, and corrosion inhibiting material disposed in said container.

8. A composite fitting comprising a substantially cylindrical cage member, a ball disposed in said cage member and longitudinally movable therein, a first end of said cage member having an open neck therein, said ball sealing said neck when seated thereagainst, a second end of said cage member having a ring diosposed therein to retain said ball within said cage member, exterior threads on said cage member adjacent said first end thereof for securing said first end of said cage member in an aperture, longitudinal slots in said cage member for permitting the transverse flow of fluid therethrough, a substantially cylindrical sleeve insertable in said neck with a portion extending into said cage member, said sleeve unseating said ball upon entry into said cage member, said portion of said sleeve extending into said cage member being a cylinder open on one end and having a plurality of open ended slots therein for permitting circulation of fluid through said sleeve, exterior threads on said sleeve and interior threads in said neck for securing said sleeve to said cage member, an O-ring seal disposed on said sleeve between said exterior threads and said first end of said cage member, a fluid outlet from said sleeve exiting between said exterior threads and said seal, a container within said sleeve, a ring disposed within said sleeve adjacent said open end to retain said container therein, said container being porous, and corrosion inhibiting material disposed in said container.

9. A composite fitting comprising a substantially cylindrical cage member adapted for insertion in an aperture, first and second cage member ends, means substantially adjacent said first end for securing said first end of said cage member in an aperture, an opening in said cage member for permitting transverse flow of fluid into said cage member, a ball disposed in said cage member and longitudinally movable therein, an open neck in said first end of said cage member, said ball sealing said neck when seated thereagainst, means for retaining said ball within said cage member, a probe insertable in said neck with a first end portion protruding into said cage member and a second end portion protruding from said cage member, said first end portion unseating said ball upon entry into said cage member, threaded portions in said neck and on said probe for securing said probe to said cage member, an O-ring seal annularly disposed on said probe, said O-ring seal contacting said neck to form a fluid tight seal, a passageway running the length of said probe and open on both ends, at least one opening in the side of said first end portion of said probe for admitting fluid to said passageway from said cage member, and said second end portion arranged to receive a hose into which said passageway may drain.

References Cited in the file of this patent

UNITED STATES PATENTS

| | | |
|---|---|---|
| 1,859,126 | Boeuf | May 17, 1932 |
| 2,050,590 | Smith | Aug. 11, 1936 |
| 2,841,314 | Munson | July 1, 1958 |

FOREIGN PATENTS

| | | |
|---|---|---|
| 18,162 | Great Britain | of 1888 |